United States Patent [19]

Murayama

[11] 4,292,855
[45] Oct. 6, 1981

[54] TRANSMISSION FOR A FARM TRACTOR OF FOUR WHEEL DRIVE TYPE

[75] Inventor: Yoshinobu Murayama, Sakai, Japan

[73] Assignee: Kubota, Ltd., Osaka, Japan

[21] Appl. No.: 950,297

[22] Filed: Oct. 11, 1978

Related U.S. Application Data

[63] Continuation-in-part of Ser. No. 909,790, May 26, 1978.

[30] Foreign Application Priority Data

Jan. 28, 1978 [JP] Japan ................................. 53-8646
Feb. 7, 1978 [JP] Japan ................................ 53-13802
Feb. 7, 1978 [JP] Japan ................................ 53-13803

[51] Int. Cl.³ ...................... F16H 37/00; F16H 3/08; F16H 37/08
[52] U.S. Cl. ..................... 74/15.4; 74/15.6; 74/15.66; 74/360; 74/371; 74/372; 74/700; 180/53 CD
[58] Field of Search ............... 74/360, 371, 372, 700, 74/15.4, 15.6, 15.66, 15.82; 180/53 R, 53 CD, 53 D, 49

[56] References Cited

U.S. PATENT DOCUMENTS

| | | | |
|---|---|---|---|
| 2,618,979 | 11/1952 | Benning | 74/15.4 |
| 2,661,634 | 12/1953 | Bechman et al. | 180/53 CD X |
| 2,838,940 | 6/1958 | Swenson et al. | 74/700 X |
| 3,733,912 | 5/1973 | Murayama | 74/15.4 |
| 4,141,424 | 2/1979 | Murayama | 180/53 CD |

Primary Examiner—Leslie Braun
Attorney, Agent, or Firm—Haseltine and Lake

[57] ABSTRACT

In a farm tractor of four wheel drive type, a speed change device for a power takeoff shaft projecting from a rear portion of a transmission case for driving a work implement attached to the rear end of the tractor is mounted in the rear portion of the transmission case, and a main shaft to receive output of the engine, a pinion shaft for driving the rear wheels and a transmission shaft for driving the front wheels are mounted in the front half of the transmission case with minimum spacing between the three shafts. This arrangement permits the transmission case to be compact in the vertical as well as transverse directions and provides a large space in the tractor underbelly for attaching a work implement.

6 Claims, 7 Drawing Figures

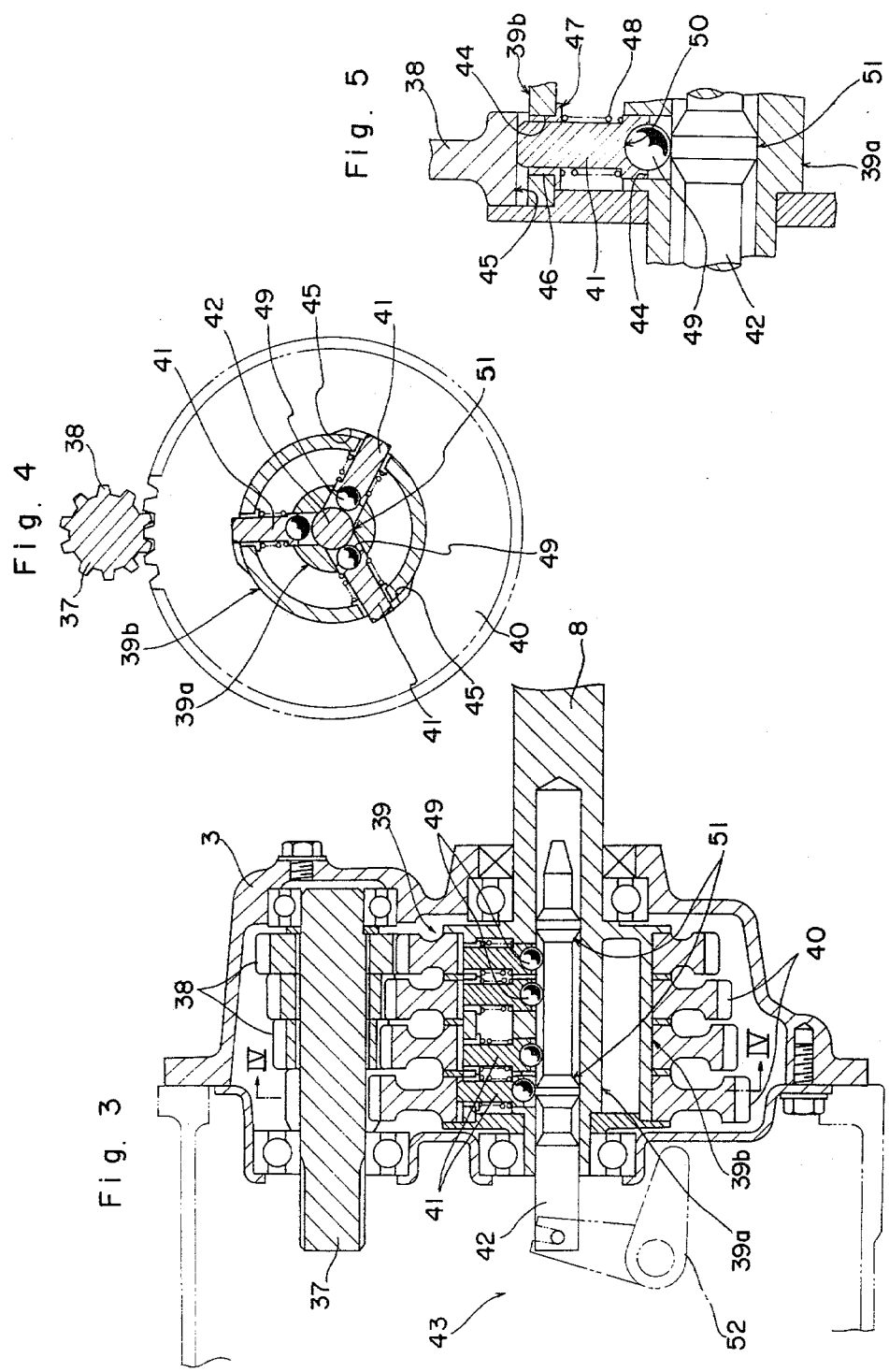

TRANSMISSION FOR A FARM TRACTOR OF FOUR WHEEL DRIVE TYPE

This application is a continuation-in-part of application Ser. No. 909,790, filed May 26, 1978.

BACKGROUND OF THE INVENTION

This invention relates to a transmission for a farm tractor of four wheel drive type with an engine connected to a front part of a transmission case and a power takeoff shaft projecting from the rear end of the transmission case.

The transmission case of the existing tractor of this type has a concentration of main and auxiliary speed change means and speed change means for the power takeoff shaft in the central and forward portion, and a main shaft to receive engine output, a differential shaft, a transmission shaft for driving the front wheels, the power takeoff shaft, and a transmission shaft linked with the power takeoff shaft are disposed with large spacing between one and the other. Therefore, the transmission case has to be large in vertical and transverse directions and has the disadvantage of permitting only insufficient space in the tractor underbelly for attaching a work implement.

SUMMARY OF THE INVENTION

The transmission according to this invention comprises a main shaft mounted in the transmission case to extend from a front end to a rear end thereof and adapted to receive output from the engine, main speed change means provided above the main shaft, auxiliary speed change means provided below an intermediate portion of the main shaft and adapted to receive the output of the main speed change means, a pinion shaft adapted to transmit power to differential speed change means for rear wheel drive through the auxiliary speed change means, power takeoff shaft speed change means adapted to receive power from a rear portion of the main shaft extending over a top portion of the differential speed change means, and a transmission shaft for front wheel drive mounted in a lower portion of the transmission case and operatively connected to the pinion shaft.

In this construction, the power takeoff shaft speed change means is disposed in the rear end of the transmission case and is arranged to receive power from a rear portion of the main shaft mounted over the top portion of the differential speed change means. Such arrangement dispenses with the space otherwise required in the central and forward portion of the transmission case for accommodating the power takeoff shaft and the speed change means therefor, and permits the main shaft, the pinion shaft and the transmission shaft for driving the front wheels to be disposed with small spacing between them, which results in a transmission case compact in the vertical and transverse directions. This is extremely advantageous in that the tractor now has a large space in its underbelly and a work implement may be attached adjacent to the middle of the tractor body.

The principal object of this invention is to provide a compact transmission case having small vertical and transverse dimensions in the central and front portions thereof, so as to leave a large space in the underbelly of the tractor.

Another object of this invention is to provide a compact transmission arrangement between the main speed change means and the auxiliary speed change means.

Further objects of this invention are to facilitate operation of the main speed change means, the auxiliary speed change means, and the power takeoff shaft speed change means without requiring clutch operation, to provide for compact containment in the transmission case of hydraulic pumps for raising and lowering work implements carried by the tractor, and to minimize the piping length and dispense with a tank for hydraulic pressure oil by utilizing gear lubricating oil in the transmission case as hydraulic pressure medium.

Other objects and advantages of this invention will be apparent from the following description.

BRIEF DESCRIPTION OF THE DRAWINGS

FIG. 3 is an enlarged vertical section of power takeoff shaft speed change means as shown in FIG. 2, FIG. 4 is a section taken on line IV—IV in FIG. 3, FIG. 5 an enlarged section showing how link pins shown in FIG. 3 are mounted.

DESCRIPTION OF THE PREFERRED EMBODIMENTS

Figure 1:
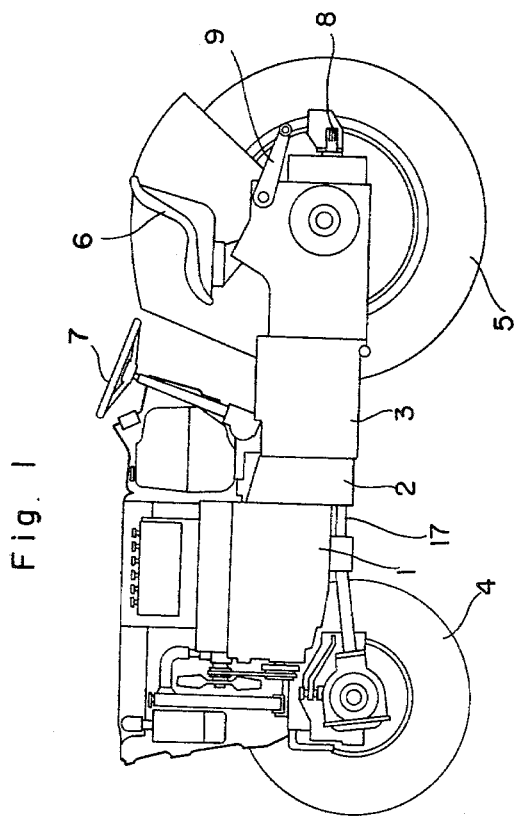
FIG. 1 is a side elevation of a farm tractor of four wheel drive type according to this invention.

The farm tractor of four wheel drive type shown in FIG. 1 comprises an engine 1, a main clutch housing 2, a transmission case 3, dirigible front wheels 4, rear wheels 5, a seat 6, a steering wheel 7, a power takeoff shaft 8, and a lift arm 9.

Figure 2:
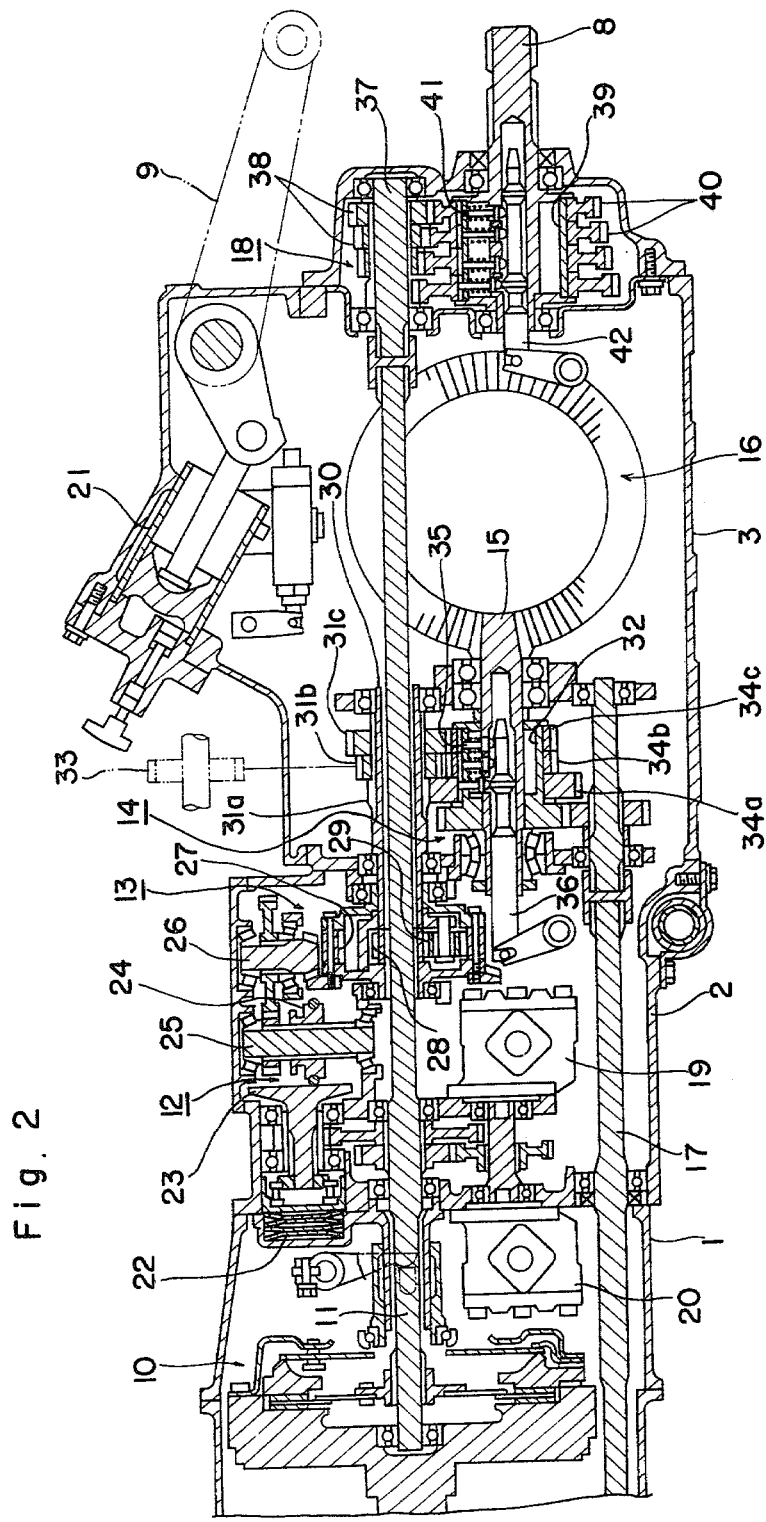
FIG. 2 is a vertical section of a transmission according to this invention.

Referring to FIG. 2 showing a transmission, power from the engine is transmitted to a main shaft 11 through a main clutch 10, and then to main speed change means 12, planetary reduction means 13, auxiliary speed change means 14, a pinion shaft 15 which is the final speed change shaft, and to differential speed change means 16 for rear wheel drive. From the pinion shaft 15 power is transmitted also to a transmission shaft 17 for front wheel drive mounted in a lowermost portion of the transmission case. The arrangement includes direct transmission of power from main shaft 11 to power takeoff shaft speed change means 18 provided in a rear portion of the transmission case and to two hydraulic pumps 19 and 20 provided in a forward portion of the transmission case. Oil dispensed from hydraulic pump 19 is supplied to a hydraulic cylinder 21 for driving the lift arm through piping provided in the transmission case, and oil dispensed from hydraulic pump 20 is supplied to power steering means (not shown) for front wheels 4. In this arrangement, gear lubricating oil in the transmission case is used as pressure medium for the two pumps 19 and 20.

The main speed change means 12 comprises a disc 23 interlocked with main shaft 11 through speed-up gears for high speed rotation and thrust biased by a disc spring 22, a follower shift roller 24 adapted to contact disc 23, and a bevel pinion shaft 26 interlocked with a roller shaft 25 through reduction gears. Shift roller 24 is adapted to shift and change a contacting point between shift roller 24 and disc 23, whereby bevel pinion shaft 26 is subjected to frictional, stepless speed changes.

The planetary reduction means 13 comprises an internal gear 27 driven by bevel pinion shaft 26, a sun gear 28 driven by main shaft 11, and planet gears 29 in mesh with the two gears 27 and 28. The revolution of planet gears is taken out by a hollow shaft 30 fitted coaxially on main shaft 11. Thus, by continuously changing the rotational rate of bevel pinion shaft 26, the hollow shaft 30 is driven from a standstill condition for forward rotation with stepless speed changes, without rotating reversely.

Auxiliary speed change means 14 comprises gears 31a, 31b and 31c fixedly mounted on hollow shaft 30, gears 34a, 34b and 34c rotatably mounted on a mounting member 32 secured to pinion shaft 15, link pins 35 mounted for protrusion and retraction in mounting member 32, and a speed change cam rod 36 for selectively protruding and retracting link pins 35, gear 31a being in engagement at all times with gear 34a, gear 31b with gear 34b through a rotatable back gear 33, and gear 31c with gear 34c. By sliding cam rod 36 to protrude one of pins 35 to selectively use one of the three rotatable pairs of gears, speed changes in forward and backward travelling are obtained. Back gear 33 is in engagement with gear 31b and gear 34b at all times.

Power takeoff shaft speed change means 18 comprises gears 38 fixedly mounted on a transmission shaft 37 coupled coaxially with main shaft 11, gears 40 rotatably mounted on power takeoff shaft 8 through a mounting member 39 and engaging at all times with gears 38, link pins 41 mounted in mounting member 39, and a speed change cam rod 42. As in the case of auxiliary speed change means 14, the rotatable pairs of gears are selectively used to give four speeds to the power takeoff shaft 8 without requiring operation of the main clutch. This arrangement is described in detail hereinafter.

As shown in FIG. 3, transmission case 3 supports transmission shaft 37 carrying a plurality of integrally rotatable gears 38, gears 38 being different from one another in the number of teeth and arranged progressively from gears having a smaller number of teeth to gears having a larger number of teeth, and power takeoff shaft 8 carrying a plurality of selection side gears 40 having different numbers of teeth and engaging gears 38 respectively. Power takeoff shaft 8 is provided with operator means 43 for selecting one of selection side gears 40 for integral rotation with power takeoff shaft 8, whereby power is transmitted from transmission shaft 37 to power takeoff shaft 8 in plural speeds.

Mounting member 39 has an integral double tube construction with axial spacing between an inner tube portion 39a and an outer tube portion 39b. Each of tube portions 39a and 39b has pinholes 44 peripherally spaced from one another, and each pinhole 44 is adapted to receive a stepped link pin 41 slidably in radial directions through inner and outer tube portions 39a and 39b. Each pin 41 is adapted to engage with an engaging portion 45 defined on the inner periphery of each selection side gear 40 rotatably mounted on outer tube portion 39b.

Each of pins 41 has a large diameter end facing the axis of power takeoff shaft 8. Each pinhole 44 of outer tube portion 39b to receive a small diameter end of pin 41 is provided with a sleeve 46 to absorb vibration of pin 41. A coil spring 48 is disposed between a flange 47 of sleeve 46 and a stepped portion of pin 41 so that pin 41 is biased away from each selection side gear 40. It will be understood that sleeves 46 for absorbing vibrations of pins 41 in pinholes 44 of outer tube portion 39b which have a diameter larger than the small diameter ends of stepped pins 41 are effectively used in that flanges 47 thereof serve to support one end of each coil spring 48.

Each of stepped pins 41 is formed with a recess 50 on the large diameter end thereof to receive a ball 49. Inner tube portion 39a contains cam rod 42 which is slidable in axial directions. Cam rod 42 has integral projections 51 at intermediate positions in the axial direction. As cam rod 42 slides, either one of projections 51 pushes pins 41 through balls 49 outwardly in radial directions for selective engagement with gears 40.

Reference number 52 in the drawing indicates an operating arm linked with cam rod 42, which is oscillatable to slide cam rod 42.

As described, auxiliary speed change means 14 and power takeoff shaft speed change means 18 are respectively arranged that pins 35 and 41 are engageable with and disengageable from selection side gears 34a and 40. Therefore, it involves only formation of holes 44 in mounting members 32 and 39 of double tube construction to receive pins 35 and 41 and insertion thereinto of pins 35 and 41, springs 48 and sleeves 46. Such construction is simple and easy to make and assemble, which results in advantages of manufacture.

Figure 6:
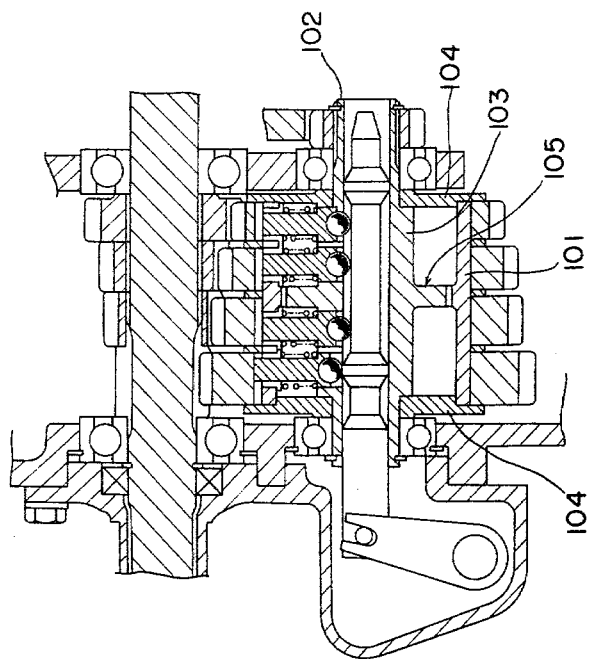
FIG. 6 is a vertical section of a modified power takeoff shaft speed change means.

In FIG. 6, an outer tube portion 101 is not integral with an inner tube portion 103 which is part of a hollow power takeoff shaft 102. Outer tube portion 101 is supported by inner tube portion 103 through disc shaped spacers 104 disposed at both ends of outer tube portion 103. Inner tube portion 103 includes an integral boss 105 projecting radially from an axially intermediate position thereof, which boss 105 is in spline with the inner periphery of outer tube portion 101. Accordingly, the two tube portions 101 and 103 are connected for rotation in an integral manner.

Figure 7:
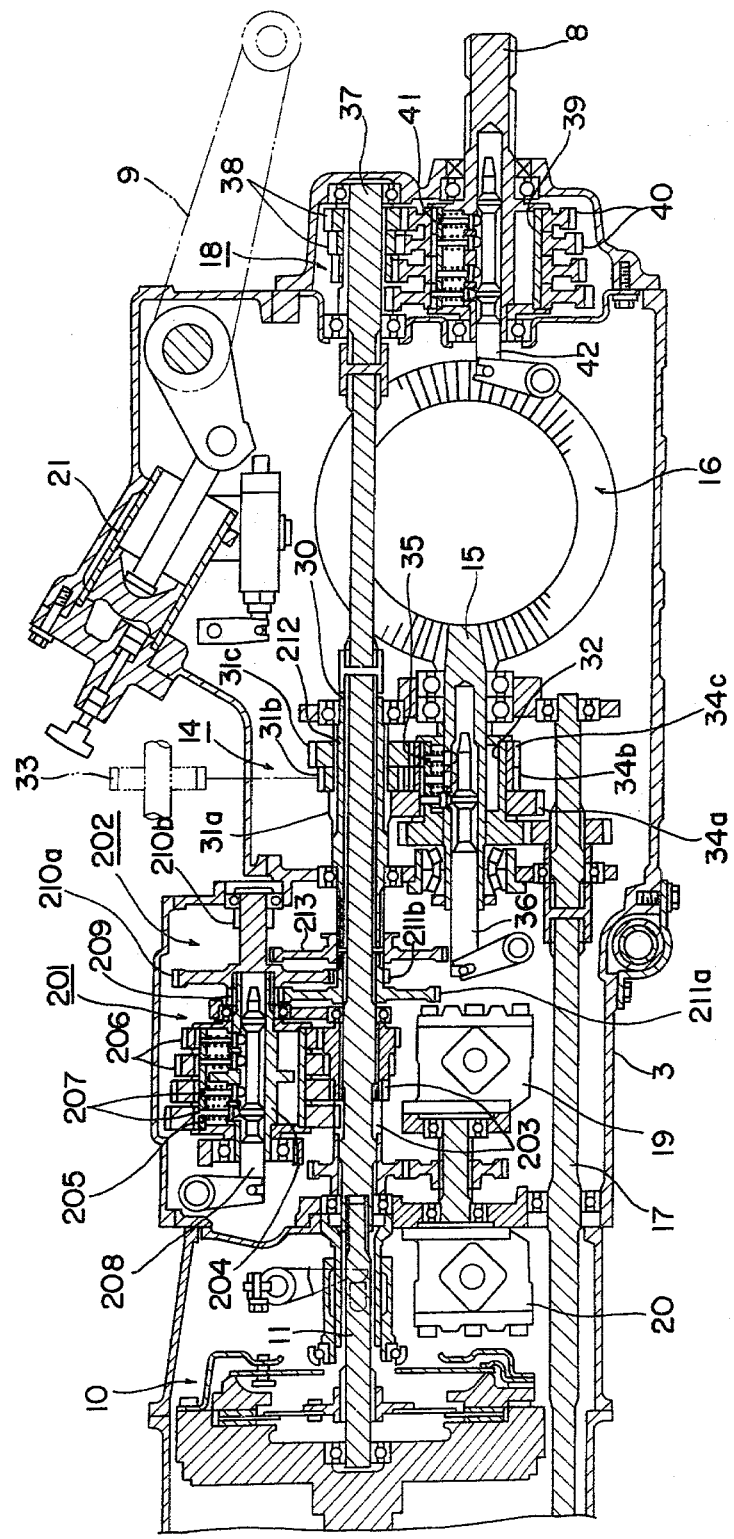
FIG. 7 is a vertical section of a modified transmission.

FIG. 7 shows a modification of the transmission system between main shaft 11 and auxiliary speed change means 14 in the transmission of FIG. 2. Here, power from the engine received by main shaft 11 is transmitted to auxiliary speed change means 14 through main speed change means 201 and super-reduction means 202. This arrangement is hereinafter described in detail. The parts other than main speed change means 201 and super-reduction means 202 are the same as in the transmission of FIG. 2. Those parts are referred to by the same reference numbers and a further description thereof is not given.

The main speed change means 201 comprises four gears 203 fixedly mounted on main shaft 11, a hollow transmission shaft 204 disposed above main shaft 11, gears 206 rotatably mounted on transmission shaft 204 through a mounting member 205 and engaging at all times with gears 203, link pins mounted in mounting member 205 displaceably in directions vertical to the gear axis, and a speed change cam rod 208 for protruding and retracting pins 207 relative to mounting member 205. This arrangement is adapted to provide four forward speeds without requiring operation of the main clutch, by sliding cam rod 208 to protrude one of link pins 207 and use one of the four pairs of rotatable gears.

Details of the arrangement for speed changes in main speed change means 201 are the same as those already described with reference to FIGS. 3 to 5, and no further explanation is given.

Super-reduction means 202 comprises a gear 209 fixedly mounted on transmission shaft 204, large and small rotatable gears 210a and 210b disposed coaxial with transmission shaft 204, two-step gears 211a and 211b rotatably mounted on main shaft 11 and engaging gear 209 and gear 210a, a hollow shaft 212 rotatably fitted about main shaft 11, and a shift gear 213 splined to hollow shaft 212. When, as shown in the drawing, shift gear 213 is in a position to straddle from a boss portion of two-step gears 211a and 211b to hollow shaft 212, an output of main speed change means 201 is transmitted to hollow shaft 212 in an ordinary manner reducing the speed by one step.

When shift gear 213 is shifted to the right into engagement with small gear 210b, an output of main speed change means 201 is subjected to super-reduction and transmitted to hollow shaft 212 at the speed reduced by three steps.

What I claim is:

1. A transmission for a farm tractor of four-wheel drive type comprising: a transmission case of substantially rectangular shape in side view extending longitudinally of a tractor body, a main shaft mounted in said case to extend from a front end to a rear end thereof and operatively connected to an engine disposed forwardly of the case, plural-step main speed change means disposed in a front position within the case and above the main shaft and operatively coupled to the main shaft, auxiliary speed change means disposed rearwardly of the main speed change means and beneath the main shaft and operatively connected to the main speed change means, differential speed change means for rear wheel drive disposed in a rear and lower position within the case and operatively connected to the auxiliary speed change means, a transmission shaft for front wheel drive disposed to extend forwardly of the case from a position beneath the auxiliary speed change means and adjacent a bottom inner surface of the case and operatively connected to the auxiliary speed change means, power takeoff shaft speed change means disposed in a rear end position of the case and operatively connected to the main shaft, a hydraulic cylinder disposed in an upper rear position within the case for vertically oscillating a lift arm attached to a rear portion of said case, and a hydraulic pump disposed in a lower front position within the case for actuating said cylinder, said hydraulic pump being operatively connected to said main shaft and utilizing lubricating oil in said case as pumping oil.

2. A transmission as claimed in claim 1 comprising a hollow shaft loosely mounted on said main shaft and operatively connecting said main speed change means and said auxiliary speed change means.

3. A transmission as claimed in claim 2 comprising a further hydraulic pump for actuating another hydraulic means, said further hydraulic pump being disposed forwardly of said transmission case and operatively connected to the first said hydraulic pump.

4. A transmission as claimed in claim 1, 2 or 3, wherein said main speed change means, said auxiliary speed change means and said power take-off shaft speed change means are plural-step speed change means of the same type.

5. A transmission as claimed in claim 4, wherein said plural-step speed change means effects speed changes by selectively utulizing for power transmission one of plural pairs of rotatable gears which have been placed in engagement, and means for operating said pairs of rotatable gears comprising gear mounting members of double tube construction on the rotatable shafts, each said gear mounting member having inner and outer tube portions, a plurality of stepped link pins each having ends of different diameters slidably mounted to extend through the inner tube portions and the outer tube portions of said mounting members to respectively engage with and disengage from selection side gears constituting said pairs of rotatable gears, sleeves with flanges mounted between small diameter ends of said pins and said mounting members, coil springs mounted between flanges of said sleeves and stepped portions of said pins for disengaging said pins from said selection side gears, and cam rod means slidably mounted in said inner tube portions of said mounting members to cause said pins to engage one of said selection side gears.

6. A transmission as claimed in claim 5 comprising balls respectively interposed between said stepped link pins and said cam rod means.

* * * * *